United States Patent
Rezaiifar et al.

(10) Patent No.: US 8,457,067 B2
(45) Date of Patent: Jun. 4, 2013

(54) CACHE WITH VARIABLE LIFETIME FOR STORING OVERHEAD MESSAGES FOR FEMTO DEPLOYMENTS

(75) Inventors: Ramin Rezaiifar, San Diego, CA (US); Parag Arun Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 657 days.

(21) Appl. No.: 12/480,564

(22) Filed: Jun. 8, 2009

(65) Prior Publication Data

US 2010/0067485 A1 Mar. 18, 2010

Related U.S. Application Data

(60) Provisional application No. 61/097,074, filed on Sep. 15, 2008.

(51) Int. Cl.
*H04W 4/00* (2009.01)
*H04W 36/00* (2009.01)
*H04W 40/00* (2009.01)

(52) U.S. Cl.
USPC .............................. 370/331; 370/338; 455/436

(58) Field of Classification Search
USPC .............................. 370/331, 338; 455/436, 446
See application file for complete search history.

(56) References Cited

U.S. PATENT DOCUMENTS

| | | | |
|---|---|---|---|
| 6,321,093 B1* | 11/2001 | Dalal | 455/512 |
| 7,773,987 B2* | 8/2010 | Jain et al. | 455/435.1 |
| 2002/0025811 A1* | 2/2002 | Willey | 455/434 |
| 2004/0179492 A1* | 9/2004 | Zhang et al. | 370/331 |
| 2004/0198353 A1* | 10/2004 | Quick, Jr. | 455/435.1 |
| 2004/0203770 A1* | 10/2004 | Chen et al. | 455/435.1 |
| 2005/0036462 A1* | 2/2005 | Sillasto et al. | 370/331 |
| 2005/0096053 A1* | 5/2005 | Liu et al. | 455/439 |
| 2007/0230400 A1* | 10/2007 | Kuchibhotla et al. | 370/331 |
| 2009/0104910 A1* | 4/2009 | Lee et al. | 455/436 |
| 2009/0207805 A1* | 8/2009 | Zou | 370/331 |
| 2009/0296660 A1* | 12/2009 | Weng | 370/332 |
| 2010/0027431 A1 | 2/2010 | Morrison et al. | |
| 2010/0062772 A1* | 3/2010 | Peng et al. | 455/436 |
| 2010/0062774 A1* | 3/2010 | Motegi et al. | 455/437 |
| 2010/0099377 A1* | 4/2010 | Jeong | 455/404.2 |
| 2012/0051325 A1* | 3/2012 | Pani et al. | 370/331 |

FOREIGN PATENT DOCUMENTS

WO   WO 2004045236 A1 *  5/2004

OTHER PUBLICATIONS

International Search Report and Written Opinion—PCT/US2009/057043—ISA/EPO—Jan. 26, 2001.

* cited by examiner

*Primary Examiner* — Farah Faroul
(74) *Attorney, Agent, or Firm* — Darren M. Simon (57) ABSTRACT

Methods and apparatus for using separate caches to retain overhead information while a device is in idle mode. A first cache can be associated with a first timer and can be utilized when a device is performing idle handoff. A second cache, associated with a second timer, can be utilized when a device is not performing idle handoff. The second timer can have a longer period of validity than the first timer. The separate caches can be utilized in networks that include femto cell topography, wherein re-use of pilot PN codes are at a greater frequency than the re-use frequency in macro cell topography.

22 Claims, 8 Drawing Sheets

CACHE WITH VARIABLE LIFETIME FOR STORING OVERHEAD MESSAGES FOR FEMTO DEPLOYMENTS

CROSS-REFERENCE

This is an application claiming the benefit under 35 U.S.C. §119(e) of U.S. Provisional Application Ser. No. 61/097,074, filed Sep. 15, 2008, entitled "CACHE WITH VARIABLE LIFETIME FOR STORING OVERHEAD MESSAGES FOR FEMTO DEPLOYMENTS," and assigned to the assignee hereof and the entirety of which is incorporated herein by reference.

BACKGROUND

I. Field

The following description relates generally to wireless communications systems and more particularly to femto cell deployments.

II. Background

Wireless communication systems or networks are widely deployed to provide various types of communication; for instance, voice and/or data may be provided through wireless communication systems. A typical wireless communication system, or network, can provide multiple users access to one or more shared resources. For example, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Recently, users have started to replace fixed line communications with mobile communications and have increasingly demanded improved voice quality, reliable service, and low prices. In addition to mobile phone networks currently in place, a new class of small base stations has emerged, which may be installed in a user's home or other area and which provide indoor wireless coverage to mobile units using existing broadband Internet connections. Such personal miniature base stations are generally known as access point base stations, or, alternatively, Home Node B (HNB) or femto cells. Typically, such miniature base stations are connected to the Internet and the mobile operator's network through a DSL router or a cable modem.

Femto cells transmit a small amount of power and have a much smaller coverage area as compared to macro cells, which have large coverage areas. Femto cells are added in a network to provide coverage where there might be a void in the macro cell coverage and/or where extra capacity is desired. Thus, this new type of network deployment topology that includes a mixture of macro cells and femto cells is becoming more common.

Pilot PN (PseudoNoise) codes are transmitted by femto cells and/or macro cells to provide overhead information to devices that would like to gain access to sectors covered by the cells. However, there is a limit to the number of pilot PN codes that are available and, therefore, the PN codes are re-used. This is generally not a problem with macro cells, since the distance between sectors that re-use the same PN code is large. However, in a femto cell topology, the re-use frequency of the PN codes is higher and, thus, a mobile device can encounter two sectors that use the same PN code quicker than in a network that utilizes macro cells.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with utilizing at least two different cache timers and associated caches as a function of device movement or whether the device is performing idle handoff. If device is performing idle handoff (e.g., moving from one sector coverage to another sector coverage), the amount of time that overhead information is retained is small and, therefore, the cache can be refreshed frequently. If device is not performing idle handoff (e.g., moving within the sector coverage or not moving), the amount of time for retaining overhead information can be increased. Further, the amount of time that overhead information is retained can be dynamically adjusted if motion of device changes (e.g., changes from not performing idle handoff to performing idle handoff, changes from performing idle handoff to not performing idle handoff).

An aspect relates to a method performed by a communications device for storing overhead messages in a communications network. Method includes determining whether the communications device is performing idle handoff or is not performing idle handoff and s starting a first timer or a second timer based on the determination. Each timer has a different duration. Further, method includes storing overhead information in at least one cache and discarding at least a subset of the overhead information retained in the at least one cache upon expiration of the first timer or the second timer.

Another aspect relates to a wireless communications apparatus that includes a memory and a processor. The memory retains instructions related to ascertaining idle handoff performance of apparatus while in idle state and starting a first timer or a second timer as a function of the ascertained idle handoff performance. Memory also retains instructions related to storing overhead information during pendency of the started timer and utilizing the stored overhead information to connect to a base station associated with the stored overhead information. The processor is coupled to the memory and is configured to execute the instructions retained in the memory.

Still another aspect relates to a wireless communications apparatus that selectively retains overhead information. Wireless communications apparatus includes means for ascertaining idle handoff functions of wireless communications apparatus while in idle state and means for starting a first timer or a second timer as a function of the ascertained idle handoff functions. Wireless communications apparatus also includes means for storing overhead information during pendency of the first timer or the second timer and means for utilizing the stored overhead information to connect to a base station associated with the stored overhead information.

Yet another aspect relates to a computer program product comprising a computer-readable medium. The computer-readable medium includes a first set of codes for causing a computer to determine whether a communications device is conducting idle handoffs while in idle mode and a second set of codes for causing the computer to activate a first timer or a second timer as a function of the determination. Each timer has a different duration and is associated with a corresponding first cache or second cache. Computer-readable medium also includes a third set of codes for causing the computer to store overhead information in the corresponding first cache or second cache. Further, computer-readable medium includes a fourth set of codes for causing the computer to discard at least a subset of the overhead information retained in the first cache or the second cache upon expiration of the corresponding first timer or second timer.

A further aspect relates to at least one processor configured to store overhead information as a function of a variable timer. Processor includes a first module for determining whether idle handoffs are performed while in an idle state and a second module for starting a first timer or a second timer as a function of the determination. Processor also includes a third module for storing overhead information in the first cache or the second cache during pendency of selected corresponding timer and a fourth module for utilizing the stored overhead information to connect to a base station associated with the stored overhead information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, femto cell, or some other network entity.

Various aspects or features will be presented in terms of systems that may include a number of devices, components, modules, and the like. It is to be understood and appreciated that the various systems may include additional devices, components, modules, and so forth, and/or may not include all of the devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word exemplary is intended to present concepts in a concrete manner.

Figure 1:
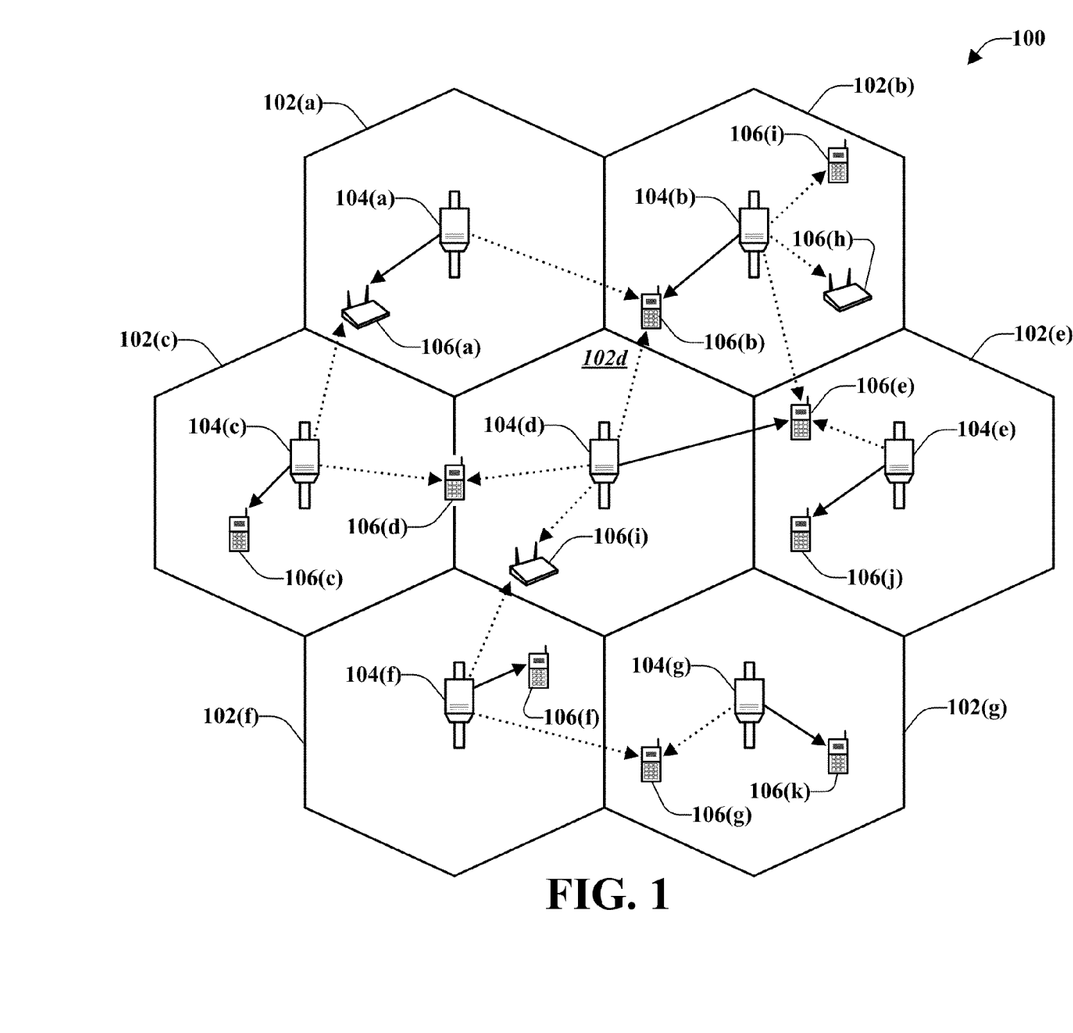
FIG. 1 illustrates an exemplary wireless communication system configured to support a number of users, in which various disclosed aspects may be implemented.

FIG. 1 illustrates an exemplary wireless communication system 100 configured to support a number of users, in which various disclosed aspects may be implemented. System 100 provides communication for multiple cells 102, such as, for example, macro cells 102a-102g. Each macro cell 102a-102g is serviced by a corresponding access point 104 (such as access points 104a-104g). Each cell 102a-102g may be further divided into one or more sectors. Various devices 106 (including devices 106a-106k), are dispersed throughout system 100. Each device 106 may communicate with one or more access points 104 on a forward link (FL) and/or a reverse link (RL) at a given moment, depending upon whether device 106 is active and whether device 106 is in soft handoff, for example. Wireless communication system 100 may provide service over a large geographic region, for example, macro cells 102a-102g may cover a few blocks in a neighborhood.

Figure 2:
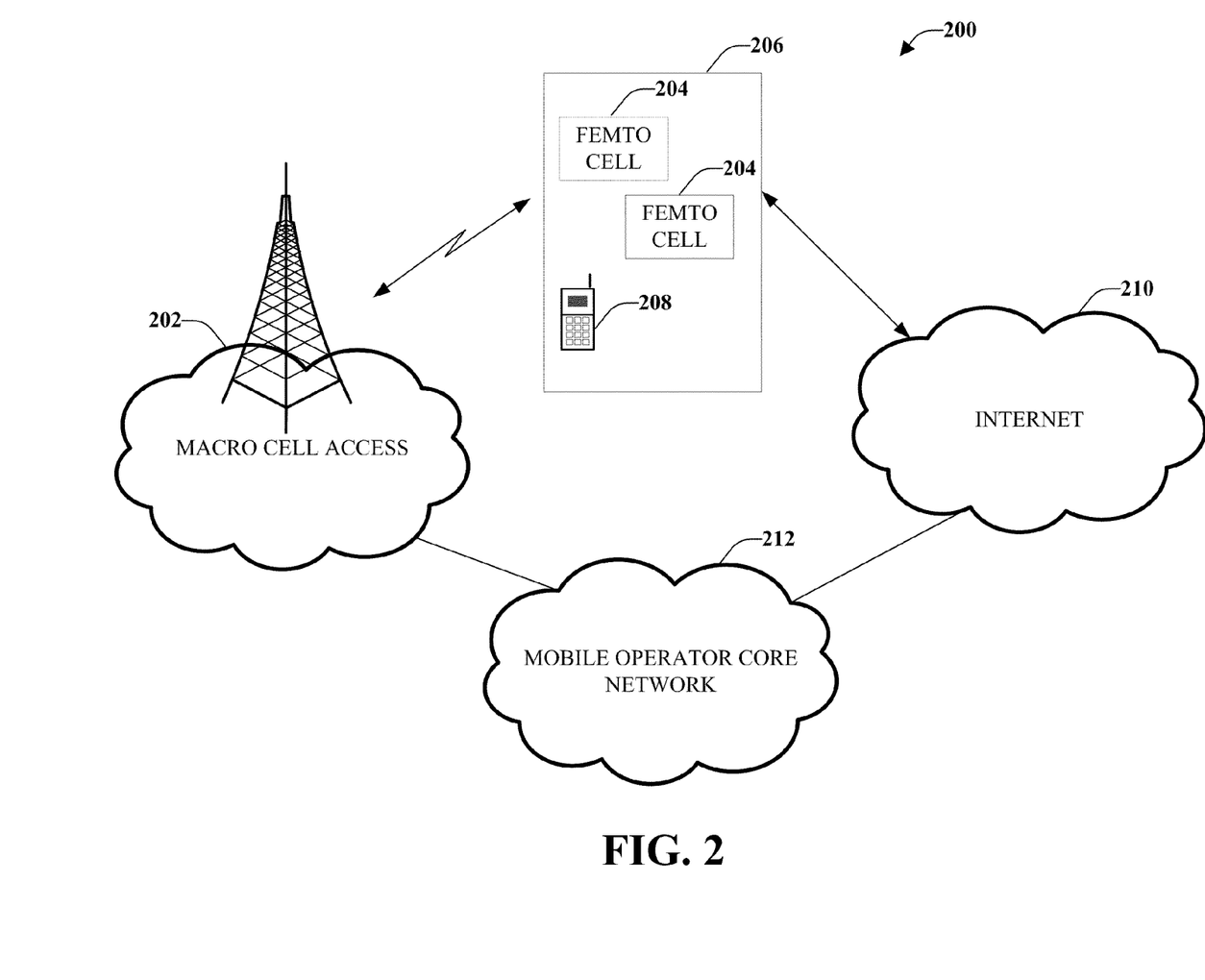
FIG. 2 illustrates an exemplary communication system that enables deployment of access point base stations within a network environment.

FIG. 2 illustrates an exemplary communication system 200 that enables deployment of access point base stations within a network environment. System 200 includes macro cell access 202. Included in system 200 can be multiple access point base stations or Home Node B units (HNBs) or femto cells, such as, for example, femto cells 204. Each femto cell 204 is installed in a corresponding small scale network environment, such as, for example, in one or more user residences 206. Femto cells 204 are configured to serve associated, as well as alien, user equipment 208. Each femto cell 204 is further coupled to the Internet 210 and a mobile operator core network 212 through a DSL router (not shown) or, alternatively, a cable modem (not shown).

Although embodiments described herein use 3 GPP terminology, it is to be understood that the disclosed aspects may be applied to 3 GPP (Rel99, Rel5, Rel6, Rel7) technology, as well as 3 GPP2 (1×RTT, 1×EV-DO Rel0, RevA, RevB) technology and other known and related technologies. In such aspects described herein, the owner of femto cell 204 subscribes to mobile service, such as, for example, 3 G mobile service, offered through mobile operator core network 212, and user equipment 208 is capable to operate both in macro cellular environment and in residential small scale network environment. Thus, femto cell 204 is backward compatible with any existing user equipment 208 (e.g., legacy devices).

With increased frequency, network deployment topology is changing to topologies that include a mixture of macro cell coverage and femto cell coverage. For example, each macro cell, illustrated in FIG. 1, can include a plurality of femto cells.

Every sector (both macro and femto) transmits a pilot PN (PseudoNoise) code. However, there are a limited number of pilot PN codes available for use, thus, some re-use pattern or frequency is utilized so that pilot PN codes can be repeated. Generally, neighboring sectors do not utilize that same pilot PN code, however, as the sectors become more remote from each other, the same pilot PN code can be re-used. For example, in a macro cell topology, an operator is aware of the distance that the pilot PN code is re-used in the network, such as no less than ten miles (which is only an example). The operator is also aware of the maximum speed at which a device can move from a first sector to a second sector that happen to use the same PN code, such as ten minutes (which is only an example). Thus, device should not cache overhead information for more than ten minutes. If device is allowed to cache overhead information for longer than ten minutes, there is the possibility that device will enter the coverage area of second sector and, since second sector utilizes the same PN code as first sector, device will misidentify second sector as first sector. This misidentification can result in device using the incorrect overhead information and, thus, communication failure (e.g., outage) results.

Alternatively or additionally, if device is not performing idle handoff, there is no need to refresh the cache as frequently as the cache should be refreshed were device performing idle handoff. For example, device might be placed on the user's desk at work. Device might remain on the desk (or within coverage area of a sector, such as a femto cell that provides coverage to the office), and, therefore, the overhead information retained in cache is the overhead information that is needed while user (and device) remains in the office. Thus, in accordance with some aspects, the length of time overhead information is retained in cache is extended while device is not performing idle handoff, which can mitigate the number of times device must wake up and read the overhead information in case the device moved. This mitigation of wake up periods can increase battery life, which can enhance a user experience since the battery can remain charged for a longer period.

Figure 3:
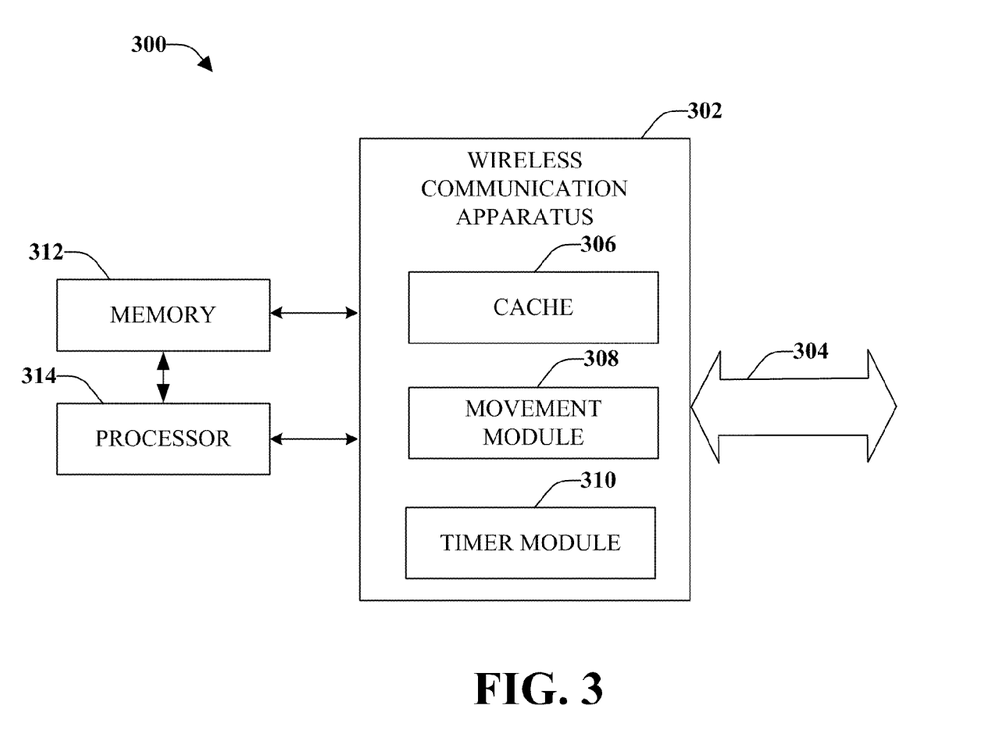
FIG. 3 illustrates a system that utilizes cache with variable lifetime for storing overhead messages, according to an aspect.

FIG. 3 illustrates a system 300 that utilizes cache with variable lifetime for storing overhead messages, according to an aspect. The disclosed aspects can be utilized with a variety of wireless communications environments (e.g., Wide Area Networks (WAN), Local Area Networks (LAN), Personal Area Networks (PAN) and so forth). Illustrated is a wireless communications environment 300 that utilizes femto cell functionality. "Femto cell" is a term generally used for personal miniature base stations installed in a user's (e.g., subscriber's) residence for providing cellular service within a home environment. However, femto cells can be utilized in a variety of environments (e.g., office, store, coffee shop, library, and so on) and are not limited to a home environment.

Femto cells usually employ radio access network (RAN) functionality (e.g., base transceiver system (BTS), base station controller (BSC), packet data serving node (PDSN), or other network elements) and provide service to a limited number of users. Femto cells can be connected to the Internet and the cellular operator's network through a DSL router, cable modem, or by other techniques.

System 300 includes a wireless communication apparatus 302 that is shown to be transmitting data through a channel 304. Although depicted as transmitting data, wireless communication apparatus 302 can also receive data through channel 304 (e.g., wireless communication apparatus 302 can concurrently transmit and receive data, wireless communication apparatus 302 can transmit and receive data at different times, or combinations thereof).

In idle mode, mobile device 302 obtains overhead information from sectors that mobile device 302 has visited. This overhead information can be retained in cache 306. By caching this overhead information, if mobile device 302 later visits those sectors again, the overhead information broadcast by the sector does not have to be re-read, but can be accessed from cache 306. If apparatus 302 is in active (or connected) mode, overhead information is not cached (e.g., apparatus 302 reads the overhead information in connected state because the overhead contains information related to the connection supervision that apparatus 302 monitors while connected).

Apparatus 302 also includes a movement module 308 that is configured to determination whether apparatus 302 is performing idle handoff or not performing idle handoff (e.g., if apparatus 302 is moving with the sector coverage, apparatus 302 is not performing idle handoff). Based on whether apparatus 302 is performing idle handoff, a timer module 310 is configured to track an elapsed amount of time and, after expiration of the time, the information retained in cached is removed. The elapsed amount of time is a function of whether apparatus 302 is performing idle handoff or not performing idle handoff. If apparatus 302 is not performing idle handoff, the amount of time that pilot PN codes are retained in cached 306 can be for a period of time that is longer than the amount of time that pilot PN codes are retained if apparatus 302 is performing idle handoff.

For example, in an extreme case, there can be 100 kilometers between sectors that use the same PN code (e.g., re-use) and apparatus 302 does not travel faster than 50 kilometers per hour. In this situation, apparatus 302 should not cache overhead information for more than two hours since apparatus 302 could travel from a first sector to a second sector, wherein both the first sector and the second sector utilize the same PN code. If the PN code of first sector is retained in cache 306 for longer than two hours (amount of time to travel between first and second sector), apparatus 302 would mistake second sector for first sector and use the PN code for first sector, resulting in outage (e.g., dropped call, loss of coverage, and so on). However, if PN code of first sector is retained in cache 306 and apparatus 302 comes within coverage area of first sector before expiration of the two hour interval, it indicates that the sector is the same sector from which the PN code was received. In this case, the PN code is retrieved from cache 306 and overhead information of first sector does not have to be read again, saving time and increasing performance aspects of apparatus 302.

In the situation where apparatus 302 is not performing idle handoff, there is no need for apparatus 302 to refresh cache 306 as often as cache 306 would be refreshed were apparatus 302 performing idle handoff (e.g., being moved from place to place). Thus, when apparatus 302 is not performing idle handoff, overhead information can be retained in cache 306 for a long period of time because apparatus 302 is not moving from one sector to another sector with the same PN code. However, if apparatus 302 starts to perform idle handoff (e.g., user is leaving work), movement module 308 can detect the movement (e.g., can detect that apparatus 302 is performing idle handoff) and the amount of time PN codes are retained in cache 306 can be reduced as a function of the movement. On the other hand, if apparatus 302 was performing idle handoff and movement module 308 determines apparatus 302 is no longer performing idle handoff (e.g., not in motion or moving within the sector coverage), the amount of time overhead information is retained in cache 306 can be extended as a function of the lack of idle handoff.

It should be noted that if apparatus is connected (e.g., not just performing idle mobility) or active on network, overhead information might not be cached. This is due to the fact that other overhead information is needed by apparatus 302 when connected. In accordance with some aspects, the contents of cache 306 are purged when apparatus 302 enters an active state (e.g., connected to network).

System 300 can include memory 312 operatively coupled to apparatus 302 (and/or cache 306). Memory 312 can be external to apparatus 302 or can reside within apparatus 302. Memory 312 can store information related to ascertaining whether apparatus is performing idle handoff or not, selecting a first cache or a second cache as a function of the ascertained idle handoff performance, storing overhead information in the selected cache during pendency of a timer associated with the selected cache, and utilizing the stored overhead information to connect to a network associated with the stored overhead information. Memory also retains other suitable information related to signals transmitted and received in a communication network. A processor 314 can be operatively connected to apparatus 302 (and/or memory 312) to facilitate analysis of information related to automatically caching overhead information in a communication network. Processor 314 can be a processor dedicated to analyzing and/or generating information received by apparatus 302, a processor that controls one or more components of system 300, and/or a processor that both analyzes and generates information received by apparatus 302 and controls one or more components of system 300.

Memory 312 can store protocols associated with variable lifetime cache for storing overhead messages, taking action to control communication between apparatus 302 and other devices, access points, and so forth, such that system 300 can employ stored protocols and/or algorithms to achieve improved communications in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

As discussed above, wireless communications apparatus 302 should receive advertised overhead parameters from base stations (e.g., femto cells, operator installed base stations, and so on). If apparatus 302 is stationary or not performing idle handoff, apparatus 302 should read overhead parameters once and store the overhead parameters for a relatively long time while apparatus 302 is idle. If apparatus 302 is in motion and performs idle handoff relatively frequently, apparatus 302 should cache overhead parameters. However, the cache should be refreshed more frequently than when apparatus 302 does not perform idle handoff. If the overhead is not cached and apparatus 302 is forced to pick up the overhead information each time idle handoff is performed, battery life can be affected severely. If apparatus 302 utilizes the same cache lifetime that is used when idle handoff is not performed, then apparatus 302 may idle handoff to a sector where the same PN code is reused. In this situation, apparatus 302 will use the incorrect stored overhead information, which can cause apparatus 302 to not register, resulting in outage (e.g., communication failure) in addition to using the wrong parameter to gain access. Due to the popularity of femto cell, the PN re-use issue becomes more critical.

In accordance with the disclosed aspects, problems associated with reduced battery life and incorrect overhead information are mitigated. Apparatus 302 implements a separate cache with a shorter cache lifetime for the "idle handoff" case. The duration of this shorter lifetime cache associated with idle handoff can be a maximum value that mitigates the probability of apparatus entering a re-use area.

Figure 4:
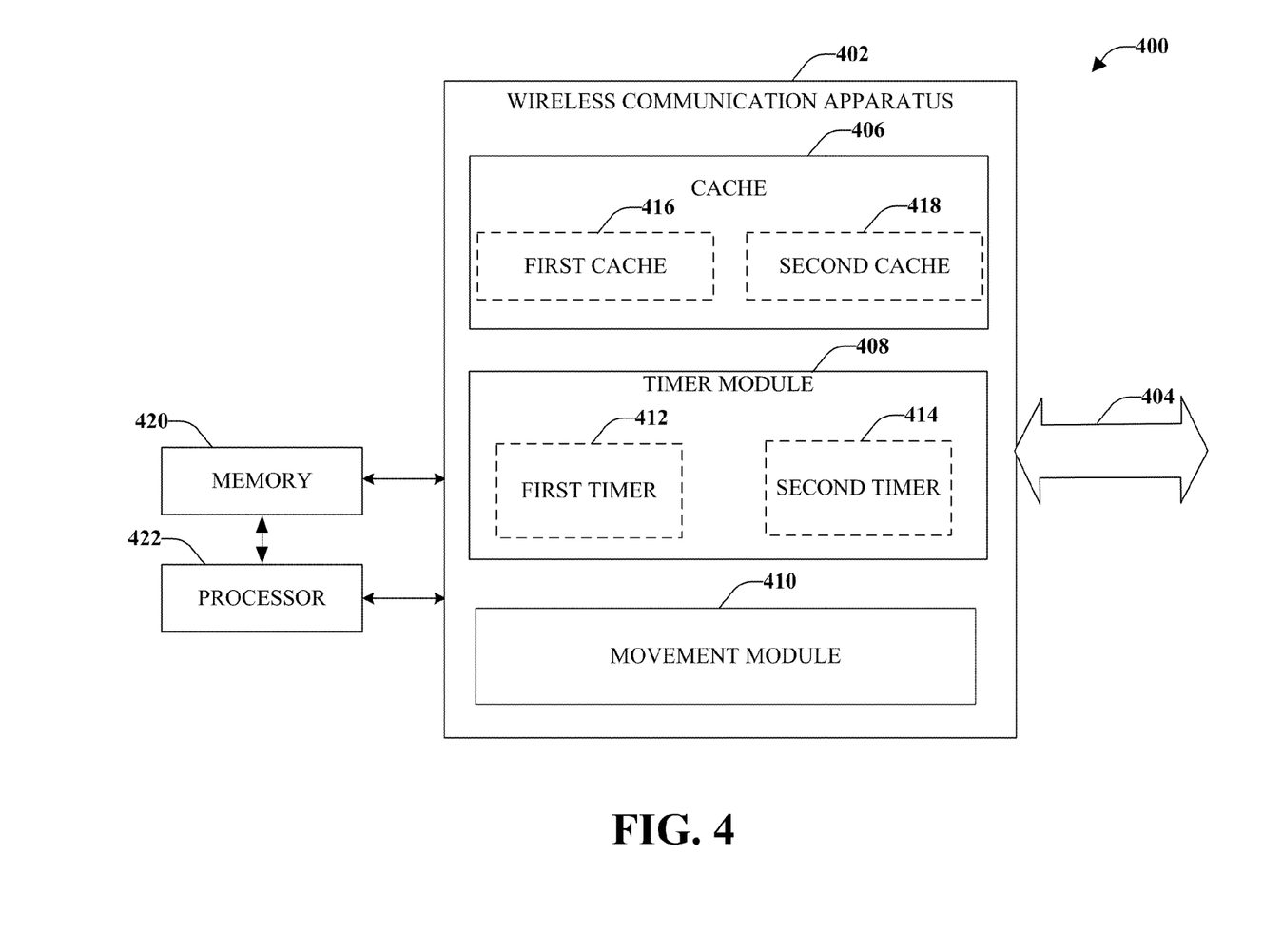
FIG. 4 illustrates a system for caching overhead information as a function of whether or not idle handoff is being performed, according to an aspect.

FIG. 4 illustrates a system 400 for caching overhead information as a function of whether or not idle handoff is being performed, according to an aspect. System 400 includes a wireless communication apparatus 402 that is shown to be receiving data through a channel 404. It should be understood that although shown to be receiving data through channel 404, communication apparatus 402 can also transmit data through channel 404 (e.g., communication apparatus 402 can receive and transmit data at substantially the same time, communication apparatus 402 can receive and transmit data at different times, or combinations thereof).

QuickConfig messages are utilized to indicate a change in content of an overhead message and to provide information that changes frequently. Conventional systems require apparatus 402 to receive a copy of QuickConfig message each time apparatus 402 performs an idle handoff, even if apparatus 402 has already cached the information and a ConfigChange parameter of QuickPage message has not changed since the last time the message was received. This unnecessary awake period has a negative effect on battery life. The disclosed aspects, have the advantage of dynamically adjusting the awake period as a function of whether idle handoff is being performed, and, therefore, can prolong battery life. Thus, in accordance the disclosed aspects, apparatus 402 is allowed to return to "sleep" mode if cached information exists and a ConfigChange parameter has not changed.

Apparatus includes a cache 406 that is configured to retain overhead information until expiration of a timer 408. The amount of time overhead information is retained in cache 406 is a function of whether apparatus 402 is in motion, which is determined by a movement module 410. Movement module 410 can evaluate whether apparatus 402 is moving or not moving by evaluating whether when apparatus 402 wakes up it is on the same PN or a different PN than apparatus 402 was on when apparatus 402 went into sleep mode. If apparatus 402 wakes up and is on the same PN code and frequency, it indicates that apparatus is not in motion, and a longer cache timer can be utilized. However, if the PN code on which apparatus 402 wakes up is different from the PN code on which apparatus 402 woke up the last time (and apparatus 402 wakes up every x seconds), it indicates apparatus 402 is moving and a shorter cache timer can be utilized.

Timer module 408 can include two independent timers, first timer 412 and second timer 414, each having different expiration values. First timer 412 can be utilized if apparatus 402 is not performing idle handoff and second timer 414 can be utilized if apparatus 402 is performing idle handoff (as determined by movement module 410). For example, if movement module 410 determines apparatus 402, which was previously not performing idle handoff, is now performing idle handoff, the cache timer can be automatically switched from first timer 412 to second timer 414. In another example, if apparatus 402 was performing idle handoff and is no longer performing idle handoff, a switch from second timer 414 to first timer 412 can be made by timer module 408.

In further detail, apparatus 402 can be in one of at least two modes or states, such as active mode and idle mode. If in active mode, overhead information (e.g., QuickConfig information) does not need to be cached as disclosed herein. However, the disclosed aspects can be utilized when apparatus 402 is in idle mode.

In accordance with some aspects, a large value for the cache lifetime is desired. However, the large value can have the negative side effect that it may cause apparatus 402 to idle handoff to a different sector with the same <PN, frequency> within the cache lifetime and not obtain the new overhead information for a while. On the other hand, the large cache lifetime is desirable for apparatuses that do not perform idle handoff often. Therefore, timer module 408 includes a first timer 410 and a second timer 412, which are independent from each other. First timer 410 has an associated first cache 416 and second timer 412 has an associated second cache 418. First cache 416 and second cache 418 can be separate and independent caches according to various aspects. In accordance with some aspects, first timer 410 can be a Short-TermOverheadCachePeriod and second timer 412 can be a LongTermOverheadPeriod. Further, first cache 416 can be a ShortTermOverheadCache and second cache 418 can be a LongTermOverheadCache.

Apparatus 402 can determine which cache 416, 418 to use based on state of idle handoff (e.g., whether apparatus 402 has performed idle handoff or not). Upon idle handoff, apparatus 402 can examine first cache 416 and if there is an entry in that cache 416, apparatus 402 does not set the OverheadParametersUpToDate to "0". In this manner, apparatus 402 can maintain the cached overhead information for T1 seconds, provided apparatus 402 does not perform idle handoff and does not perform an idle handoff for T2 seconds, where T1>T2.

Memory 420 can be external to apparatus 402 or can reside within apparatus 402 and can store information related to retaining overhead information in a first cache and a second cache as a function of whether or not idle handoff is being performed. Memory 420 can also store other suitable information related to signals transmitted and received in a communication network. A processor 422 can be operatively connected to apparatus 402 (and/or memory 420) to facilitate analysis of information related to variable lifetime for storing overhead messages. Processor 422 can be a processor dedicated to analyzing and/or generating information received by apparatus 402, a processor that controls one or more components of system 400, and/or a processor that both analyzes and generates information received by apparatus 402 and controls one or more components of system 400.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
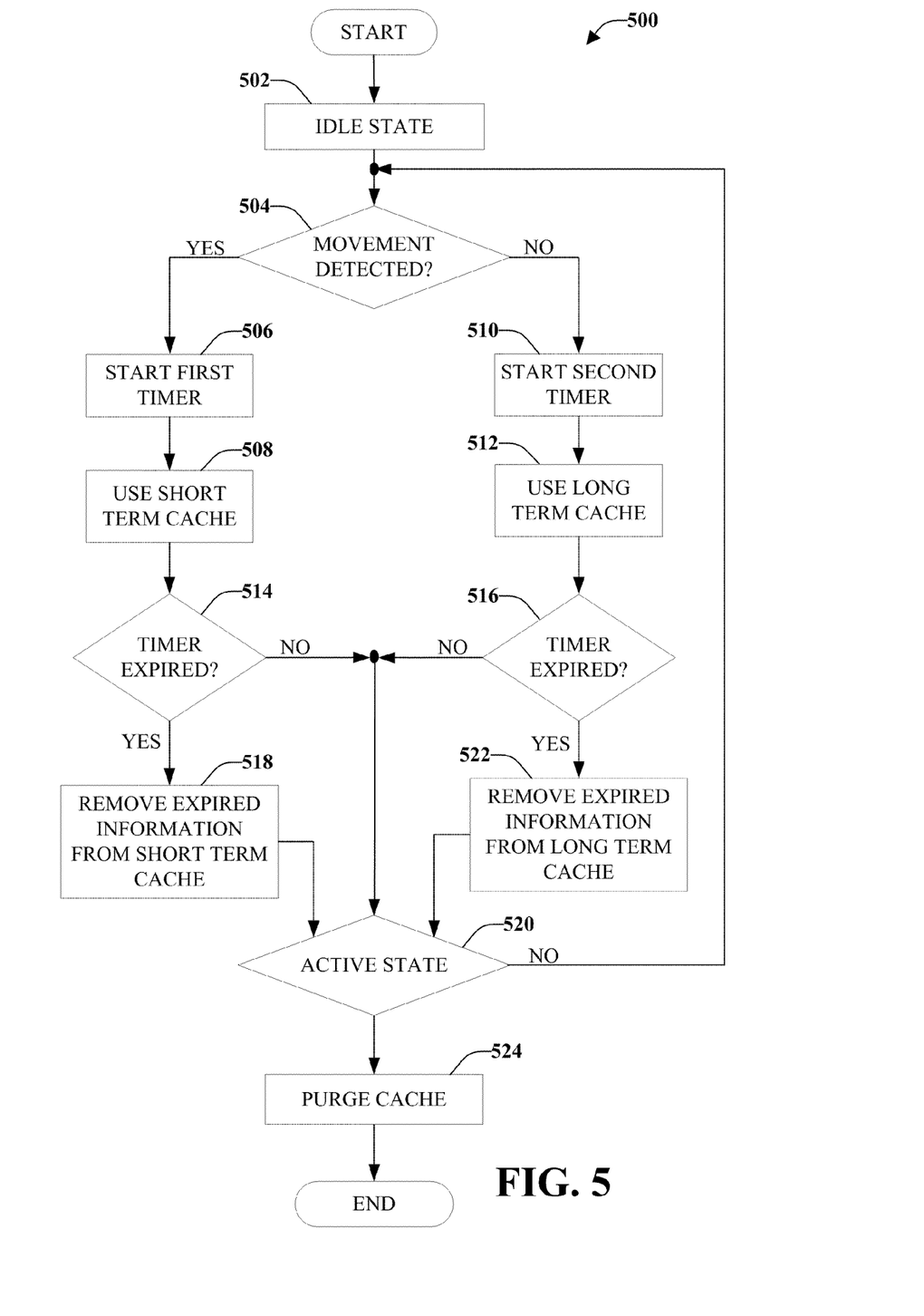
FIG. 5 illustrates a method for utilizing variable lifetimes for storing overhead messages in accordance with an aspect.

FIG. 5 illustrates a method 500 for utilizing variable lifetimes for storing overhead messages in accordance with an aspect. Method 500 is configured to use a first timer for storing overhead messages if a device is not performing idle handoff and a second timer for storing overhead messages if the device is performing idle handoff. Further, a first cache can be associated with the first timer and a second cache can be associated with the second timer.

Method 500 starts, at 502, when device is in an idle state. During idle state, device performs idle handoffs. At 504, a determination is made whether idle handoff is detected. In accordance with some aspects, this determination can be made based on an evaluation of whether handoff is being performed by device. For example, if device was on a first sector and went into "sleep" mode and upon "waking up" device was on a different PN, it indicates device is in motion (and performing idle handoff). However, if upon "waking up" device was on the same PN, it indicates that device might be stationary (or is being utilized in the same sector, such as in a home, office, and so on) and is not performing idle handoff.

If idle handoff is detected ("YES"), at 506, a first timer is started. This first timer can have a short interval, wherein during pendency of the first timer PN codes are retained in a short timer cache, at 508. If idle handoff is not detected ("NO") method 500 continues, at 510, and a second timer is started. Second timer can have a long interval because device is not moving and most likely will not encounter another sector with a cached PN code that was cached for a different sector. The PN codes can be retained in a long cache timer cache, at 512, which is associated with second timer.

At 514 and 516, a determination is made whether the respective timer being utilized has timed out or expired. If the determination at 514 is that the first timer has expired ("YES"), at 518, the overhead information that has expired is removed from short term cache and method, 500, continues, at 520. If the determination at 516 is that the second timer has expired ("YES"), at 522 the overhead information that has expired is removed from long term cache. At substantially the same time as a subset of information is removed from long term and/or short term cache, other information that is newer can be retained in cache. If the determination at 514 or 516 is that the respective timer did not time out ("NO") or after expired information is removed from the respective cache, at 520, a determination is made whether device is in active state. If device is now in active state ("YES"), at 524, the overhead information retained in long term cache and short term cache is purged.

If device is not in active state ("NO"), method 500 can continue, at 504, to determine whether movement is detected. If there is a change is the movement of device (e.g., device was stationary and is now moving, device was moving and is now stationary), method 500 can dynamically change the time and the cache that is utilized for the overhead information.

Figure 6:
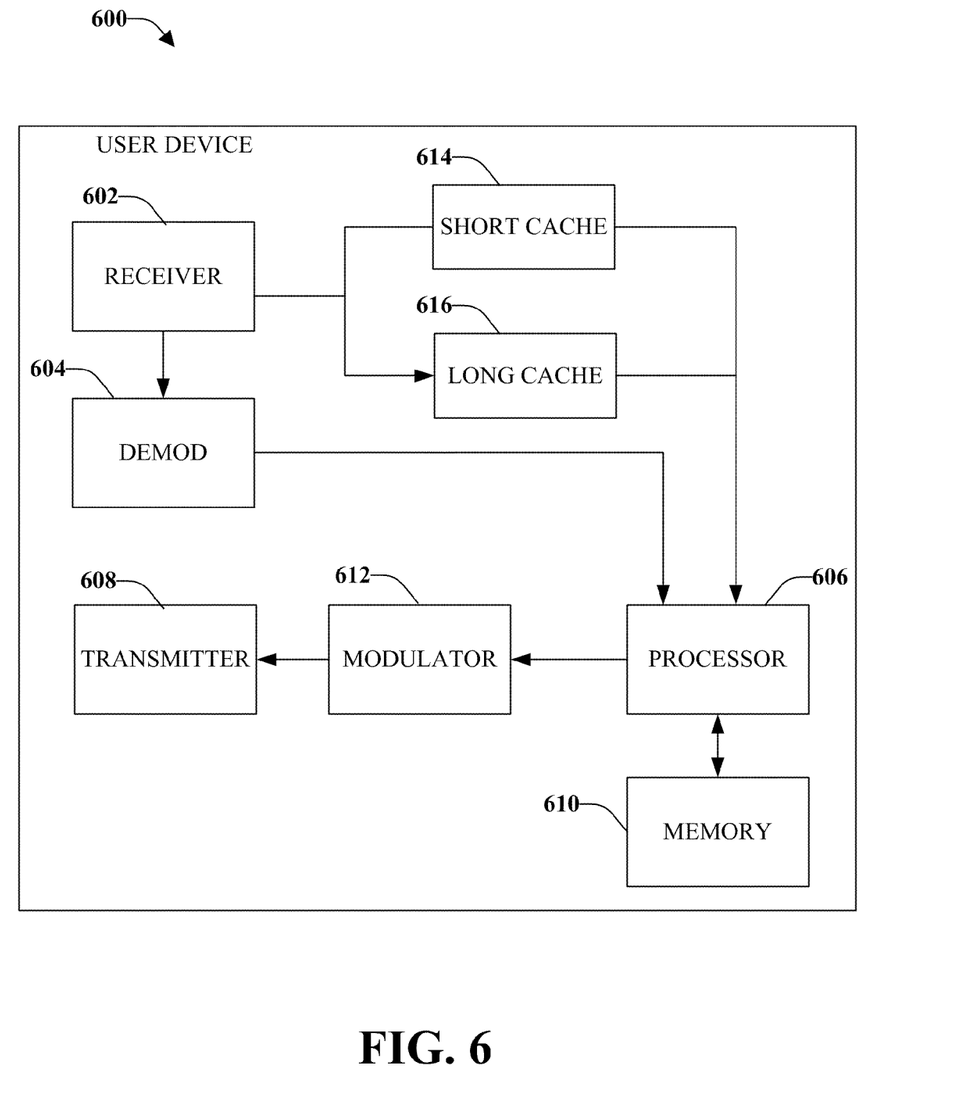
FIG. 6 illustrates a system that facilitates variable times for caching of overhead information in accordance with one or more of the disclosed aspects.

With reference now to FIG. 6, illustrated is a system 600 that facilitates variable times for caching of overhead information in accordance with one or more of the disclosed aspects. System 600 can reside in a user device. System 600 comprises a receiver 602 that can receive a signal from, for example, a receiver antenna. The receiver 602 can perform typical actions thereon, such as filtering, amplifying, down-converting, etc. the received signal. The receiver 602 can also digitize the conditioned signal to obtain samples. A demodulator 604 can obtain received symbols for each symbol period, as well as provide received symbols to a processor 606.

Processor 606 can be a processor dedicated to analyzing information received by receiver component 602 and/or generating information for transmission by a transmitter 608. In addition or alternatively, processor 606 can control one or more components of user device 600, analyze information received by receiver 602, generate information for transmission by transmitter 608, and/or control one or more components of user device 600. Processor 606 may include a controller component capable of coordinating communications with additional user devices.

User device 600 can additionally comprise memory 608 operatively coupled to processor 606 and that can store information related to coordinating communications and any other suitable information. Memory 610 can additionally store protocols associated with variable timers and caches selected as a function of device movement. User device 600 can further comprise a symbol modulator 612 and a transmitter 608 that transmits the modulated signal.

Receiver 602 is further operatively coupled to short term cache 614 that is configured to retain overhead information for a short time interval. Upon expiration of the time interval, the overhead information is removed from cache. Short term cache 614 can be utilized when idle handoff is being performed. Also included is a long term cache 616 that is configured to retain overhead information for a long time interval. Upon expiration of the time interval, the overhead information is removed from cache. Long term cache 616 can be utilized when idle handoff is not being performed. Overhead information is retained in cache 614, 616 while user device 600 is in idle mode.

Figure 7:
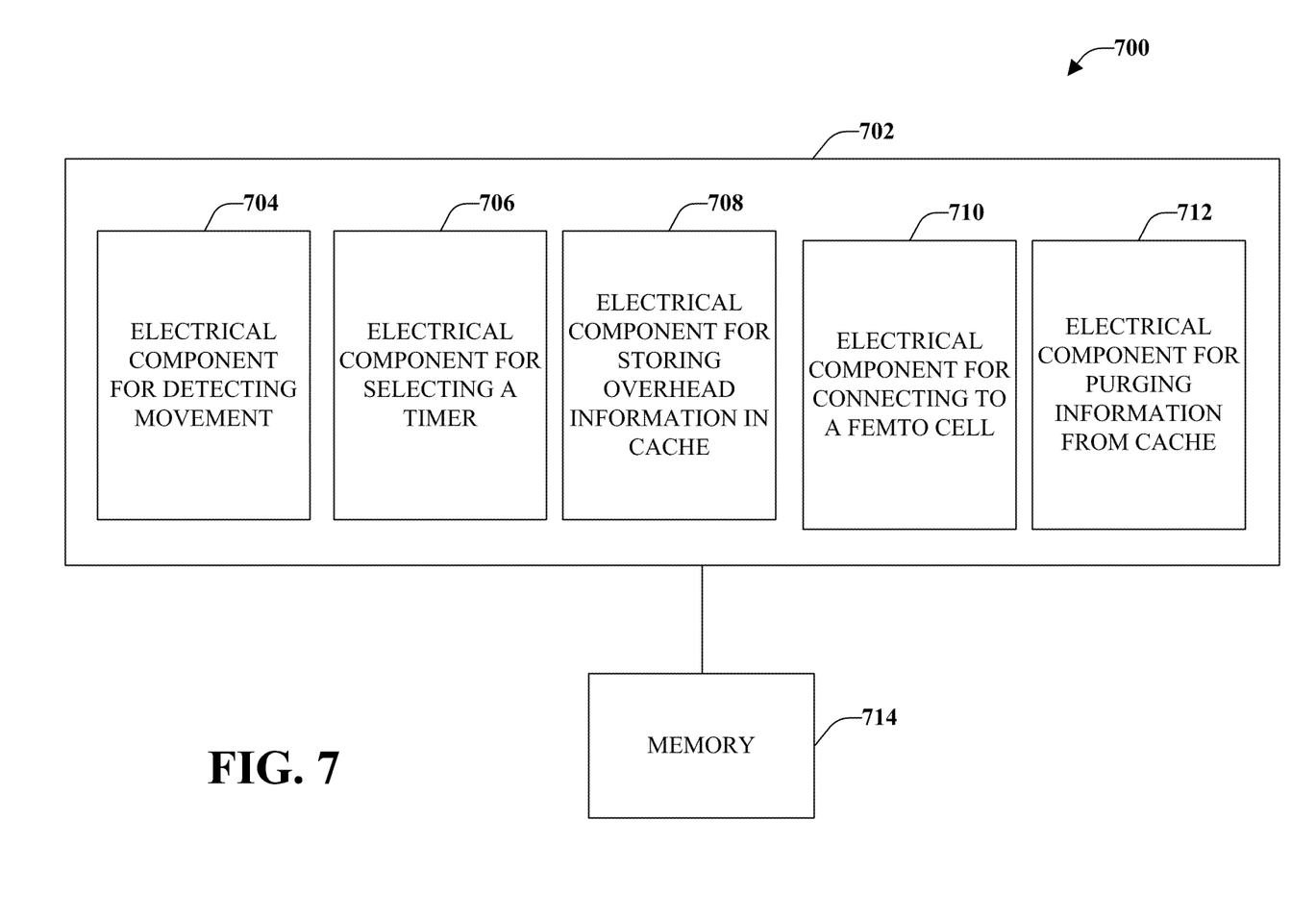
FIG. 7 illustrates an example system that dynamically adjusts a cache timer as a function of idle handoff and an operating state of a device within a communications environment, according to an aspect.

With reference to FIG. 7, illustrated is an example system 700 that dynamically adjusts a cache timer as a function of whether idle handoff if being performed. System 700 can be utilized within an environment that utilizes femto cells, according to an aspect. System 700 may reside at least partially within a mobile device. It is to be appreciated that system 700 is represented as including functional blocks, which may be functional blocks that represent functions implemented by a processor, software, or combination thereof (e.g., firmware).

System 700 includes a logical grouping 702 of electrical components that can act separately or in conjunction. Logical grouping 702 may include an electrical component 704 for determining idle handoff functions (e.g., is idle handoff not being performed, is idle handoff being performed) while in idle state. Also included is an electrical component 706 for selecting a first cache or a second cache as a function of the ascertained idle handoff function. In accordance with some aspects, the first timer has a shorter duration than the second timer.

According to some aspects, the first timer can be a Short Term Overhead Period and a first cache is a Short Term Overhead Cache. The first cache is selected if apparatus is performing idle handoffs. According to other aspects, the second cache is selected if apparatus is not performing idle handoffs, wherein the second timer is a Long Term Overhead Cache Period and a second cache is a Long Term Overhead Cache Further, logical grouping 702 includes an electrical component 708 for storing overhead information in the selected cache during pendency of a timer corresponding to the selected cache. Also included is an electrical component 710 for utilizing the stored overhead information to connect to a base station associated with the stored overhead information.

According to some aspects, electrical component 704 for determining movement also ascertains a value of a SectorSignature field in a QuickConfig message is different from a last received value for a SectorSignature associated with a sector from which the QuickConfig message is received and determines the apparatus is stationary.

In accordance with some aspects, the first cache is a Short Term Overhead Cache and the second cache is a Long Term Overhead Cache. Logical grouping 702 can include an electrical component 712 for purging the contents of the Long Term Overhead Cache and the Short Term Overhead Cache when an IdleState.ConnectionOpened indication is received.

Additionally, system 700 can include a memory 714 that retains instructions for executing functions associated with electrical components 704, 706, 708, 710, and 712 or other components. While shown as being external to memory 714, it is to be understood that one or more of electrical components 704, 706, 708, 710, and 712 may exist within memory 714.

Figure 8:
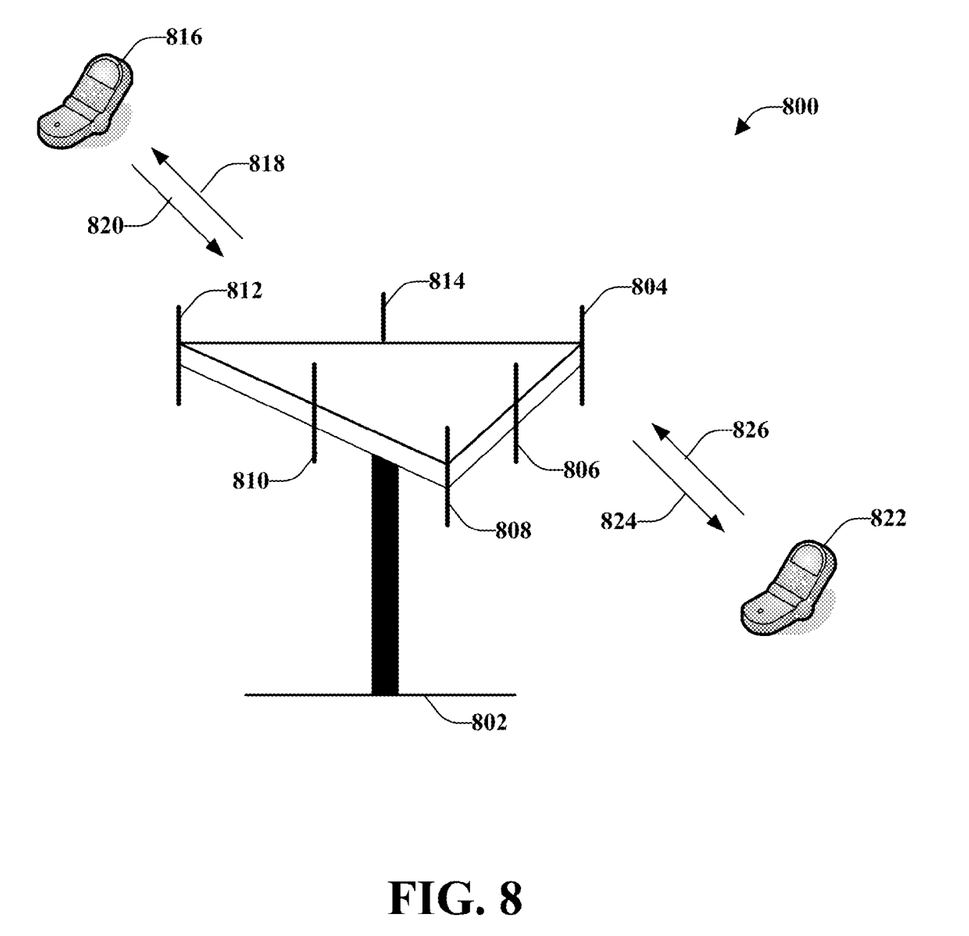
FIG. 8 illustrates a multiple access wireless communication system according to one or more aspects.

Referring now to FIG. 8, a multiple access wireless communication system 800 according to one or more aspects is illustrated. A wireless communication system 800 can include one or more base stations in contact with one or more user devices. Each base station provides coverage for a plurality of sectors. A three-sector base station 802 is illustrated that includes multiple antenna groups, one including antennas 804 and 806, another including antennas 808 and 810, and a third including antennas 812 and 814. According to the figure, only two antennas are shown for each antenna group, however, more or fewer antennas may be utilized for each antenna group. Mobile device 816 is in communication with antennas 812 and 814, where antennas 812 and 814 transmit information to mobile device 816 over forward link 818 and receive information from mobile device 816 over reverse link 820. Forward link (or downlink) refers to the communication link from the base stations to mobile devices, and the reverse link (or uplink) refers to the communication link from mobile devices to the base stations. Mobile device 822 is in communication with antennas 804 and 806, where antennas 804 and 806 transmit information to mobile device 822 over forward link 824 and receive information from mobile device 822 over reverse link 826. In a FDD system, for example, communication links 818, 820, 824, and 826 might utilize different frequencies for communication. For example, forward link 818 might use a different frequency than the frequency utilized by reverse link 820.

Each group of antennas and/or the area in which they are designated to communicate may be referred to as a sector of base station 802. In one or more aspects, antenna groups each are designed to communicate to mobile devices in a sector or the areas covered by base station 802. A base station may be a fixed station used for communicating with the terminals.

In communication over forward links 818 and 824, the transmitting antennas of base station 802 can utilize beamforming in order to improve a signal-to-noise ratio of forward links for the different mobile devices 816 and 822. Also, a base station utilizing beamforming to transmit to mobile devices scattered randomly through its coverage area might cause less interference to mobile devices in neighboring cells than the interference that can be caused by a base station transmitting through a single antenna to all the mobile devices in its coverage area.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3 GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3 GPP). Additionally, CDMA2000 and UMB are described in documents from an organization named "3rd Generation Partnership Project 2" (3 GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method performed by a communications device for storing overhead messages in a communications network, comprising:
    determining whether the communications device is performing idle handoff or is not performing idle handoff;
    starting a first timer or a second timer based on the determination, wherein each timer has a different duration;
    storing overhead information in a cache selected from at least two caches, including selecting a first cache if idle handoff is performed or a second cache if idle handoff is not performed, wherein the first cache is associated with the first timer and the second cache is associated with the second timer; and
    discarding at least a subset of the overhead information retained in the selected cache upon expiration of the first timer or the second timer.

2. The method of claim 1, wherein the communications device is performing idle handoff if in motion and the communications device is not performing idle handoff if stationary or moving with a sector coverage.

3. The method of claim 1, wherein the first timer has a shorter duration than the second timer.

4. The method of claim 1, wherein the first timer is a Short Term Overhead Period and the first cache is a Short Term Overhead Cache Period.

5. The method of claim 1, wherein the second timer is a Long Term Overhead Cache Period and the second cache is a Long Term Overhead Cache.

6. The method of claim 1, further comprising:
    detecting communications device has entered an active state; and
    purging the overhead information retained in the selected cache.

7. The method of claim 1, wherein determining whether the communications device is performing idle handoff or not performing idle handoff comprising:
    ascertaining a value of a SectorSignature field in a QuickConfig message is different from a last received value for a SectorSignature associated with a sector from which the QuickConfig message is received; and
    determining the communications device is not performing idle handoff.

8. The method of claim 1, further comprising:
    detecting the communications device has switched from not performing idle handoff to performing idle handoff; and
    automatically switching from the second timer to the first timer.

9. The method of claim 1, further comprising:
    detecting the communications device has switched from performing idle handoff to not performing idle handoff; and
    automatically switching from the first timer to the second timer.

10. The method of claim 1, wherein the communications network comprises a femto cell topology.

11. A wireless communications apparatus, comprising:
    a memory that retains instructions related to ascertaining idle handoff performance of apparatus while in idle state, starting a first timer or a second timer as a function of the idle handoff performance, storing overhead information during pendency of the started timer, and utilizing the stored overhead information to connect to a base station associated with the stored overhead information, wherein a first cache is selected if wireless communications apparatus is performing idle handoff and a second cache is selected if wireless communications apparatus is not performing idle handoff, and wherein the first cache is associated with the first timer that has a short pendency and the second cache is associated with the second timer that has a long pendency; and a processor, coupled to the memory, configured to execute the instructions retained in the memory.

12. The wireless communications apparatus of claim 11, the memory retains further instructions related to deleting a subset of the stored overhead information upon expiration of the started timer.

13. A wireless communications apparatus that selectively retains overhead information, comprising:

means for ascertaining idle handoff functions of the wireless communications apparatus while in idle state;

means for starting a first timer or a second timer as a function of the ascertained idle handoff functions;

means for storing overhead information during pendency of the first timer or the second timer, including means for selecting a first means for storing if idle handoff is performed or a second means for storing if idle handoff is not performed, wherein the first means for storing is associated with the first timer and the second means for storing is associated with the second timer; and means for utilizing the stored overhead information to connect to a base station associated with the stored overhead information.

14. The wireless communications apparatus of claim 13, wherein the first timer has a shorter duration than the second timer.

15. The wireless communications apparatus of claim 14, wherein the first timer is a Short Term Overhead Period and the first means is a Short Term Overhead Cache.

16. The wireless communications apparatus of claim 14, wherein the second timer is a Long Term Overhead Cache Period and a second means for storing is a Long Term Overhead Cache.

17. The wireless communications apparatus of claim 14, wherein the first timer is associated with a Long Term Overhead Cache and the second timer is associated with a Short Term Overhead Cache, and wherein the wireless communications apparatus further comprises means for purging the contents of the Long Term Overhead Cache and the Short Term Overhead Cache when an IdleState.ConnectionOpened indication is received.

18. The wireless communications apparatus of claim 13, wherein the means for ascertaining idle handoff functions of wireless communications apparatus while in idle state further ascertains a value of a SectorSignature field in a QuickConfig message is different from a last received value for a SectorSignature associated with a sector from which the QuickConfig message is received and determines the wireless communications apparatus is not performing idle handoff.

19. A computer program product, comprising:

a non-transitory computer-readable medium comprising:

a first set of codes for causing a computer to determine whether a communications device is conducting idle handoffs while in idle mode;

a second set of codes for causing the computer to activate a first timer or a second timer as a function of the determination, wherein each timer has a different duration and is associated with a corresponding first cache or second cache;

a third set of codes for causing the computer to store overhead information in the corresponding first cache or second cache, wherein the first cache is associated with the first timer and the first cache is selected if idle handoff is performed and the second cache is associated with the second timer and the second cache is selected if idle handoff is not performed; and a fourth set of codes for causing the computer to discard at least a subset of the overhead information retained in the first cache or the second cache upon expiration of the corresponding first timer or second timer.

20. The computer program product of claim 19, further comprising:

a fifth set of codes for causing the computer to detect a switch from not conducting idle handoff to conducting idle handoff; and a sixth set of codes for causing the computer to automatically switch from the second timer to the first timer.

21. The computer program product of claim 19, further comprising:

a fifth set of codes for causing the computer to detect a switch from conducting idle handoff to not conducting idle handoff; and a sixth set of codes for causing the computer to automatically switch from the first timer to the second timer.

22. At least one processor configured to store overhead information as a function of a variable timer:

a first processor module for determining whether idle handoffs are performed while in an idle state;

a second processor module for starting a first timer or a second timer as a function of the determination;

a third processor module for storing overhead information during pendency of the started timer, wherein the third processor module is further configured for selecting a first cache if idle handoff is performed or a second cache if idle handoff is not performed, wherein the first cache is associated with the first timer and the second cache is associated with the second cache; and a fourth processor module for utilizing the stored overhead information to connect to a base station associated with the stored overhead information.

* * * * *